United States Patent
Grimes et al.

(10) Patent No.: US 8,140,211 B2
(45) Date of Patent: Mar. 20, 2012

(54) CONTROL MODULE WITH FLEXIBLE SENSOR INPUTS

(75) Inventors: Michael R. Grimes, Saline, MI (US); Nicholas John Kalweit, Farmington Hills, MI (US)

(73) Assignee: GM Global Technology Operations LLC

( * ) Notice: Subject to any disclaimer, the term of this patent is extended or adjusted under 35 U.S.C. 154(b) by 1050 days.

(21) Appl. No.: 12/042,615

(22) Filed: Mar. 5, 2008

(65) Prior Publication Data

US 2009/0187306 A1   Jul. 23, 2009

Related U.S. Application Data

(60) Provisional application No. 61/022,639, filed on Jan. 22, 2008.

(51) Int. Cl.
*G01M 17/00* (2006.01)

(52) U.S. Cl. .......................................... 701/29; 701/36

(58) Field of Classification Search .................. 701/29, 701/36
See application file for complete search history.

(56) References Cited

U.S. PATENT DOCUMENTS

| | | | |
|---|---|---|---|
| 7,467,036 B2 * | 12/2008 | Iwagami et al. | 701/36 |
| 7,469,174 B2 * | 12/2008 | Iwagami et al. | 701/36 |
| 7,620,486 B2 * | 11/2009 | Ward et al. | 701/51 |
| 7,739,012 B2 * | 6/2010 | Komaki et al. | 701/45 |
| 7,930,080 B2 * | 4/2011 | Uono et al. | 701/45 |
| 7,933,692 B2 * | 4/2011 | Hiroshima | 701/21 |

* cited by examiner

*Primary Examiner* — Toan To

(57) ABSTRACT

A control module includes a sensor input, a discrete signal control module and a processor. The sensor input receives a sensor signal. The discrete signal control module includes a discrete signal input and selectively generates a digital signal based on the sensor signal. A processor includes a time-based input, a digital signal input, and an analog input. The time-based input and the analog input are in communication with the sensor input. The digital signal input is in communication with the discrete signal control module. The processor selectively receives one of the sensor signal and the digital signal via one of the time-based input, the digital signal input and the analog input.

20 Claims, 8 Drawing Sheets

CONTROL MODULE WITH FLEXIBLE SENSOR INPUTS

CROSS-REFERENCE TO RELATED APPLICATIONS

This application claims the benefit of U.S. Provisional Application No. 61/022,639, filed on Jan. 22, 2008. The disclosure of the above application is incorporated herein by reference.

FIELD

The present disclosure relates to vehicle control systems and more particularly to sensor inputs of a control module.

BACKGROUND

The statements in this section merely provide background information related to the present disclosure and may not constitute prior art.

Vehicle control systems typically include a control module with various sensor inputs. The sensor inputs receive signals from sensors on a vehicle. The sensors may include, for example, drivetrain sensors, vehicle guidance sensors, collision sensors, etc. The sensor inputs may include time-based, discrete, and analog inputs. An example of a time-based sensor input is an input that receives a pulse width modulated signal. An example of a discrete input is an input that receives an ON/OFF or HIGH/LOW type signal. An example of an analog input is an input that receives an analog signal that indicates a change in voltage or resistance.

The number of sensors on a vehicle is ever increasing. For this reason the required number of input pins on a control module is increasing. Also, when a control module is manufactured the total number of required sensors may be unknown for a specific implementation. In addition, the types of many of the sensor inputs may also be unknown. Furthermore, instances occur after the manufacture of a control module is finished in which sensor input requirements have changed and design updates are needed. Thus, different and/or additional sensor inputs may be needed to accommodate for other sensors than originally intended. These updates can result in less optimized solutions, costly design changes, delays in production of the control module, or differences in implementations of features.

Moreover, instances arise when the manufacturer of a sensor is changed. Different manufacturers may produce similar sensors, but that have different characteristics. For example, with respect to a discrete sensor, a sensor may require pull-up control, as opposed to pull-down control. As another example, a sensor of a manufacturer may require a different type or level of filtering than a similar sensor produced by a different manufacturer.

SUMMARY

In one embodiment, a control module is provided and includes a sensor input, a discrete signal control module and a processor. The sensor input receives a sensor signal. The discrete signal control module includes a discrete signal input and selectively generates a digital signal based on the sensor signal. A processor includes a time-based input, a digital signal input, and an analog input. The time-based input and the analog input are in communication with the sensor input. The digital signal input is in communication with the discrete signal control module. The processor selectively receives one of the sensor signal and the digital signal via one of the time-based input, the digital signal input and the analog input.

In other features, a control system is provided and includes the control module. The control system also includes a vehicle system. The processor generates an output control signal based on one of the sensor signal and the digital signal. The vehicle system performs a task based on one of the sensor signal and the digital signal.

In further features, a method of operating a control module is provided and includes receiving a sensor signal from a sensor input. A discrete signal based on the sensor signal is received. A digital signal is generated based on the discrete signal. One of a time-based input signal, the digital signal, and an analog input signal are selectively received based on the sensor signal. An output control signal is generated based on a selected one of the time-based input signal, the digital signal, and the analog input signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
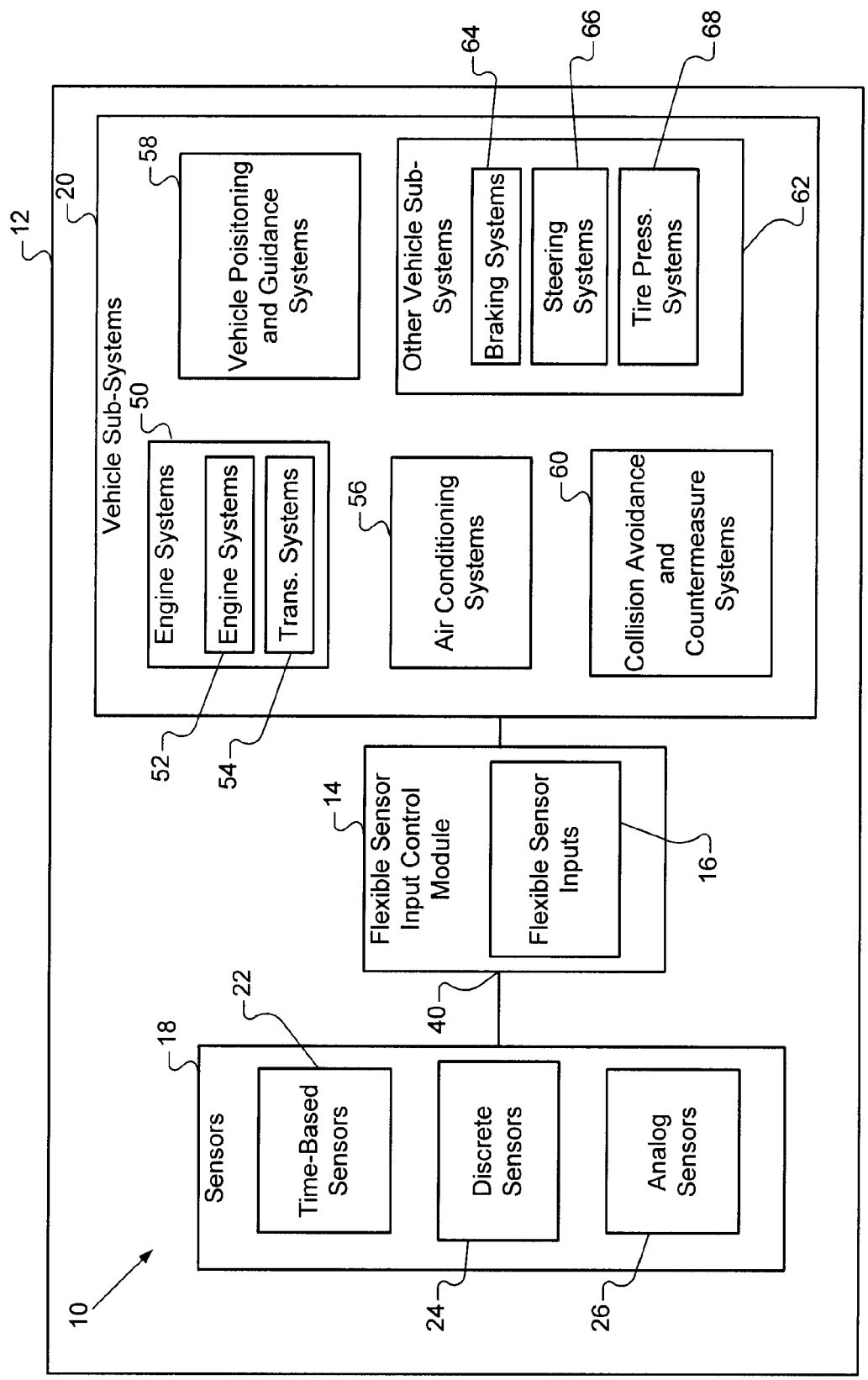
FIG. 1 is a functional block diagram of an exemplary vehicle control system incorporating a control module with flexible sensor inputs in accordance with an embodiment of the present invention.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to a printed circuit board (PCB), an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, although the following embodiments are described primarily with respect to vehicle drivetrain control systems, the embodiments may apply to other vehicle systems. For example, the embodiments may apply to braking systems, steering systems, guidance systems, countermeasure systems, safety systems, etc.

In addition, although the following embodiments are described primarily with respect to example internal combustion engines, the embodiments of the present disclosure may apply to other engines. For example, the present invention may apply to compression ignition, spark ignition, homogenous spark ignition, homogeneous charge compression ignition, stratified spark ignition, and spark assisted compression ignition engines.

Furthermore, the term flexible refers to the ability of an input of a control module to receive a signal from one of various sensors of different types, having different characteristics, and/or performing different functions. For example, with respect to an engine, a sensor may be a pressure sensor, a temperature sensor, an air flow sensor, a humidity sensor, an oxygen sensor, etc. Some example characteristics of a sensor signal are a time-based signal output, a discrete signal output, a digital signal output, or an analog signal output. Some example sensor signals are a pressure signal, a temperature signal, an air flow signal, a humidity signal, an oxygen level signal, an ON/OFF signal, etc. Other example sensor types, characteristics, and functions are disclosed below.

Referring now to FIG. 1, a functional block diagram of an exemplary vehicle main control system 10 of a vehicle 12 that incorporates a flexible sensor input control module 14 with flexible sensor inputs 16 is shown. The vehicle main control system 10 includes sensors 18, the control module 14, and vehicle sub-systems 20.

The sensors 18 include time-based sensors 22, discrete sensors 24 and analog sensors 26. The time-based sensors 22 provide time-based sensor signals. For example a time-based sensor signal may be a pulse width modulated (PWM) signal. Frequency of a PWM signal and/or time between edges of a PWM signal may be measured to obtain sensor information. As an example, a humidity sensor may provide temperature and humidity information. The temperature information may be indicated via a change in signal frequency. The humidity information may be provided via a change in pulse width.

The discrete sensors 24 refer to sensors that provide, for example HIGH/LOW signals or ON/OFF signals. The discrete signals may be generated via switches, a mass airflow (MAF) sensor, or other discrete signal generating device.

The analog sensors 26 generate analog signals. Analog signals may be provided to indicate a change in voltage or resistance. An analog signal may be generated via a thermistor, an oil pressure sensor, etc.

The control module 14 includes one or more flexible sensor inputs 40 that are each in communication with one or more of the sensors 18. Each of the flexible sensor inputs 40 may be coupled to one or more of each of the time-based sensors 22, the discrete sensors 24, and the analog sensors 26.

In one embodiment, for each flexible sensor input 40, the control module 14 selectively receives information from one of the sensors 22, 24, and 26 and not from the other sensors. The control module 14 is configured based on the sensor signal to be received.

The vehicle sub-systems 20 include drivetrain systems 50, such as engine systems 52 and transmission systems 54, air conditioning systems 56, vehicle positioning and guidance systems 58, collision avoidance and countermeasure systems 60, and other vehicle systems 62. The drivetrain systems 50 may include an internal combustion engine, a hybrid engine, an electric machine, and other power sources. The other vehicle systems 62 may include braking systems 64, steering systems 66, tire pressure systems 68, etc.

Figure 2:
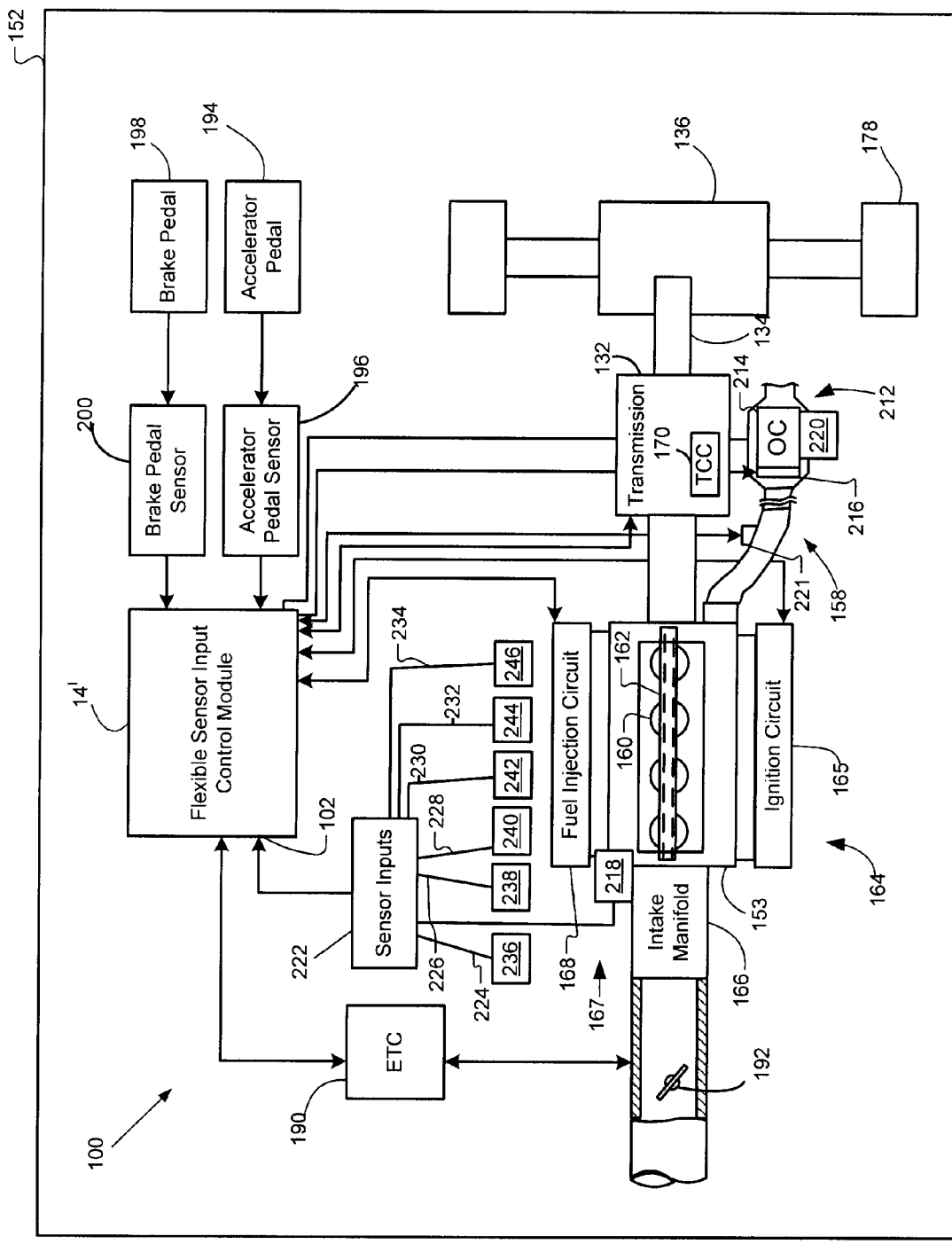
FIG. 2 is a functional block diagram of an exemplary powertrain system incorporating a control module with flexible sensor inputs in accordance with an embodiment of the present invention.

To provide an example implementation that includes multiple different sensors, the embodiment of FIG. 2 is provided.

Referring now to FIG. 2, a functional block diagram of an exemplary powertrain system 100 incorporating a control module 14I with flexible sensor inputs 102 is shown. The powertrain system 100 is on a vehicle 152 and includes an ICE 153 and an exhaust system 158.

The ICE 153 has cylinders 160. Each cylinder 160 may have one or more intake valves and/or exhaust valves. Each cylinder 160 also includes a piston that rides on a crankshaft 162. The ICE 153 may be configured with an ignition system 164 with an ignition circuit 165. The ICE 153 is also configured with a fuel injection system 167 with a fuel injection circuit 168, and the exhaust system 158. The ICE 153 includes an intake manifold 166. The ICE 153 combusts an air and fuel mixture to produce drive torque. The ICE 153 may include any number of cylinders and have various configurations.

An output of the ICE 153 is coupled by a torque converter 170, a transmission 132, a driveshaft 134 and a differential 136 to driven wheels 178. The transmission 132 may, for example, be a continuously variable transmission (CVT) or a step-gear automatic transmission. The transmission 132 is controlled by the main control module $14^I$.

Air is drawn into the intake manifold 166 via an electronic throttle controller (ETC) 190, or a cable-driven throttle, which adjusts a throttle plate 192 that is located adjacent to an inlet of an intake manifold 166. The adjustment may be based upon a position of an accelerator pedal 194 and a throttle control algorithm that is executed by the control module $14^I$. The throttle 192 adjusts output torque that drives the wheels 178. An accelerator pedal sensor 196 generates a pedal position signal that is output to the control module $14^I$ based on a position of the accelerator pedal 194. A position of a brake pedal 198 is sensed by a brake pedal sensor or switch 200, which generates a brake pedal position signal that is output to the control module $14^I$.

Air is drawn into the cylinders 160 from the intake manifold 166 and is compressed therein. Fuel is injected into cylinders 160 by the fuel injection circuit 168 and spark may be generated by the ignition system 164, when included, to ignite the air/fuel mixtures in the cylinders 160. In diesel applications, the ignition circuit may include glow plugs and/or may not be included. Exhaust gases are exhausted from the cylinders 160 into the exhaust system 158. In some instances, the powertrain system 100 can include a turbocharger that uses an exhaust driven turbine to drive a compressor that compresses the air entering the intake manifold 166. The compressed air may pass through an air cooler before entering into the intake manifold 166.

The fuel injection circuit 168 may include fuel injectors that are associated with each of the cylinders 160. A fuel rail provides fuel to each of the fuel injectors after reception from, for example, a fuel pump or reservoir. The control module $14'$ controls operation of the fuel injectors including the number and timing of fuel injections into each of the cylinders $14'$ and per combustion cycle thereof. The fuel injection timing may be relative to crankshaft positioning.

The ignition system 164 may include spark plugs or other ignition devices for ignition of the air/fuel mixtures in each of the cylinders 160. The ignition system 164 also may include the control module $14'$. The control module $14'$ may, for example, control spark timing relative to crankshaft positioning.

The exhaust system 158 may include exhaust manifolds and/or exhaust conduits and a filter system 212. The exhaust manifolds and conduits direct the exhaust exiting the cylinders 160 into the filter system 212. Optionally, an EGR valve re-circulates a portion of the exhaust back into the intake manifold 166. A portion of the exhaust may be directed into a turbocharger to drive a turbine. The turbine facilitates the compression of the fresh air received from the intake manifold 166. A combined exhaust stream flows from the turbocharger through the filter system 212.

The filter system 212 may include a catalytic converter or an oxidation catalyst (OC) 214 and a heating element 216, as well as a particulate filter, a liquid reductant system and/or other exhaust filtration system devices. The heating element 216 may be used to heat the oxidation catalyst 214 during startup of the ICE 153 and a light off process of the OC 214 and be controlled by the control module $14'$. The liquid reductant may include urea, ammonia, or some other liquid reductant. Liquid reductant is injected into the exhaust stream to react with NOx to generate water vapor ($H_2O$) and $N_2$ (nitrogen gas).

The powertrain system 100 further includes an engine temperature sensor 218, an exhaust temperature sensor 220, and one or more oxygen sensors 221. The engine temperature sensor 218 may detect oil or coolant temperature of the ICE 153 or some other engine temperature. The exhaust temperature sensor 220 may detect temperature of the oxidation catalyst 214 or some other component of the exhaust system 158. The temperatures of the ICE 153 and the exhaust system 158 may be indirectly determined or estimated based on engine and exhaust operating parameters and/or other temperature signals. Alternatively, the temperatures of the ICE 153 and the exhaust system 158 may be determined directly via the engine and exhaust temperature sensors 218, 220.

Other sensor inputs collectively indicated by reference number 222 and used by the control module $14'$ include an engine speed signal 224, a vehicle speed signal 226, a power supply signal 228, oil pressure signal 230, an engine temperature signal 232, and a cylinder identification signal 234. The sensor input signals 224-234 are respectively generated by engine speed sensor 236, vehicle speed sensor 238, a power supply sensor 240, an oil pressure sensor 242, an engine temperature sensor 244, and cylinder identification sensor 246. Some other sensor inputs may include an intake manifold pressure signal, a throttle position signal, a transmission signal, and manifold air temperature signal.

The control module $14'$ may modulate torque based upon, for example, a pedal position signal from the pedal position sensor 196 and/or signals from other sensors. The pedal position sensor 196 generates the pedal position signal based upon actuation of the accelerator pedal 194 by a driver. The other sensors may include, for example, a mass air flow (MAF) sensor, a manifold absolute pressure (MAP) sensor, an engine speed sensor, a transmission sensor, and a cruise control system sensor, and/or a traction control system sensor.

Figure 3:
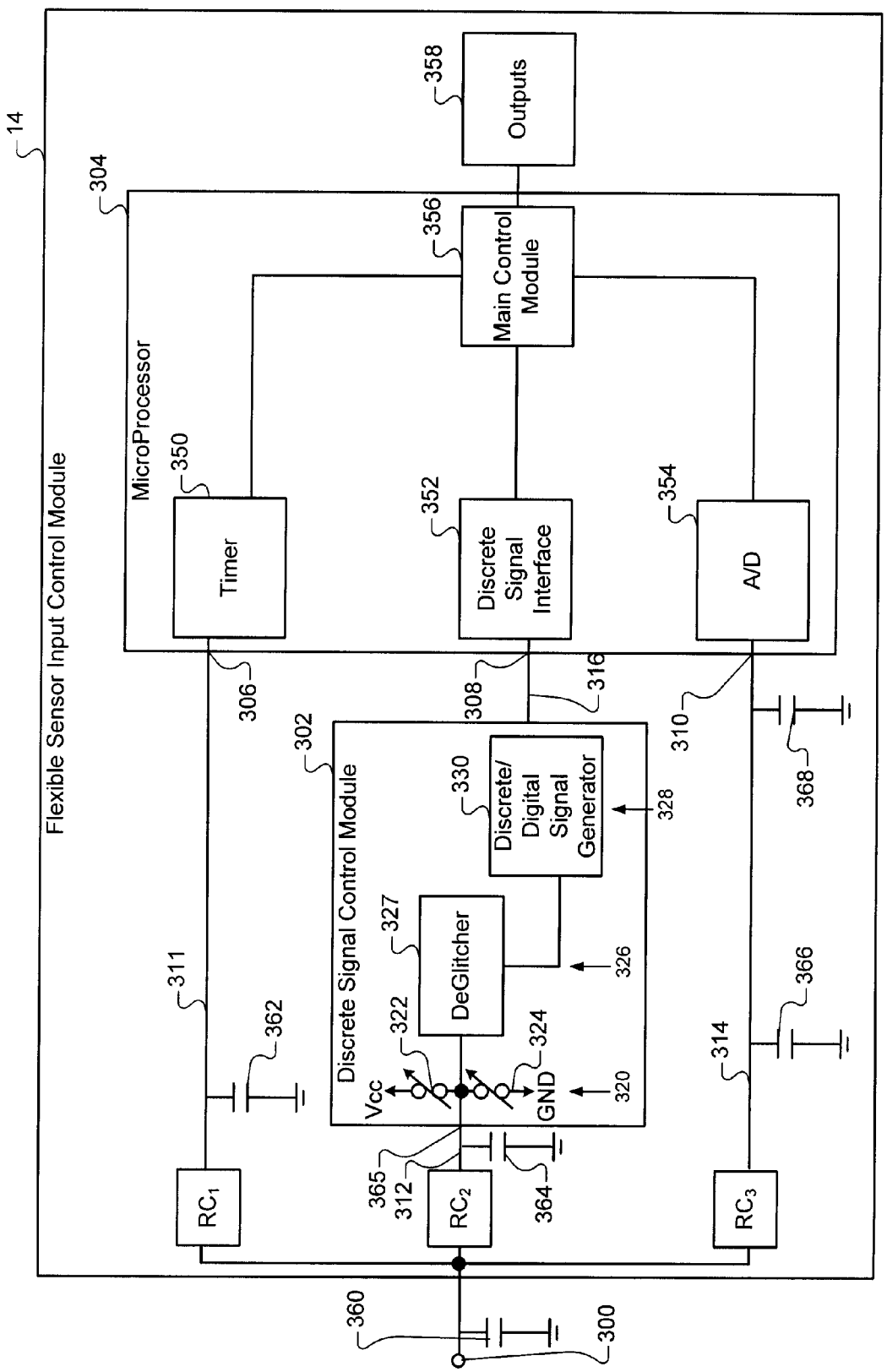
FIG. 3 is a functional block diagram of a control module with a flexible sensor input in accordance with an embodiment of the present invention.
Figure 6:
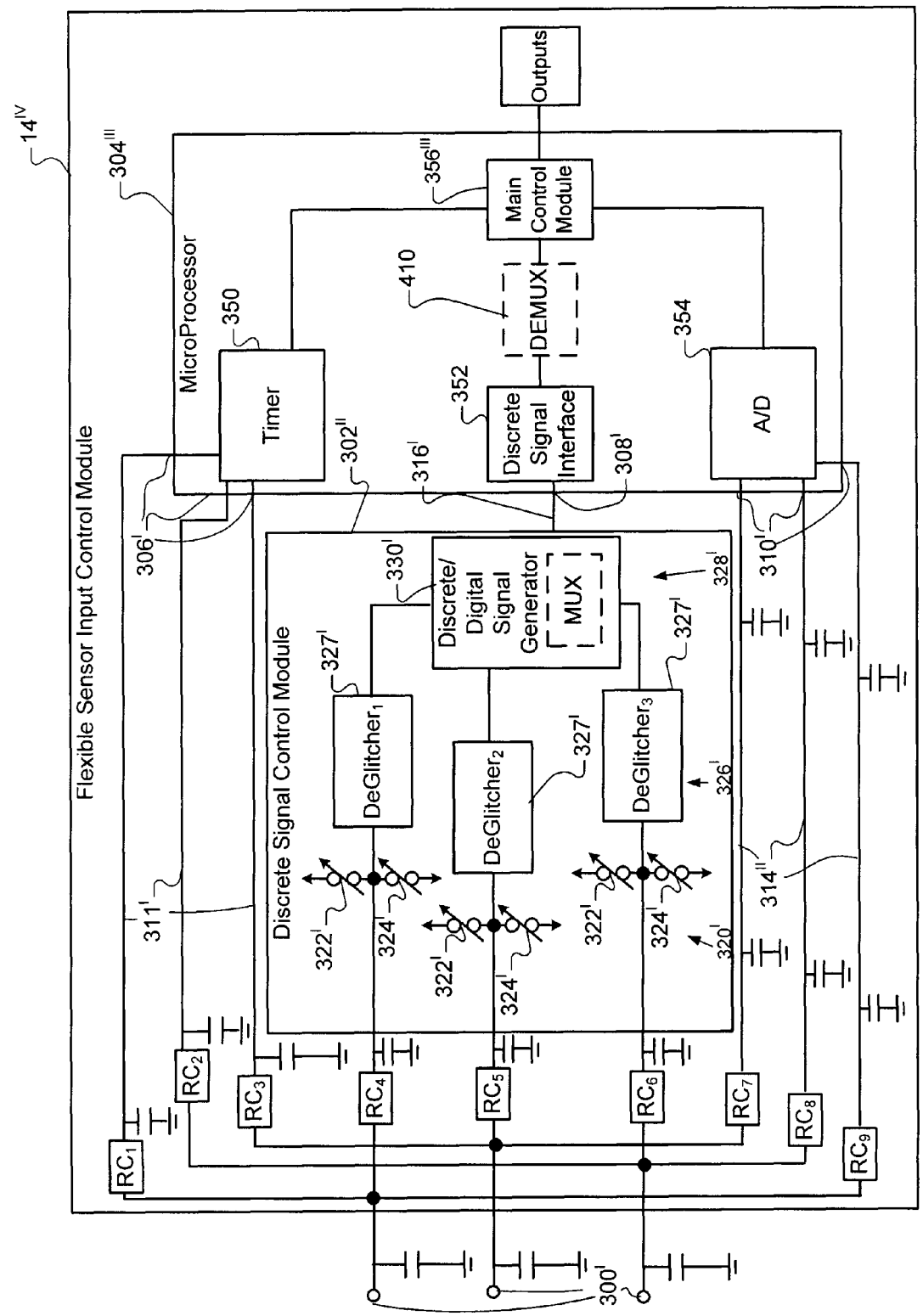
FIG. 6 is a functional block diagram of a control module with multiple flexible sensor inputs in accordance with another embodiment of the present invention.
Figure 7:
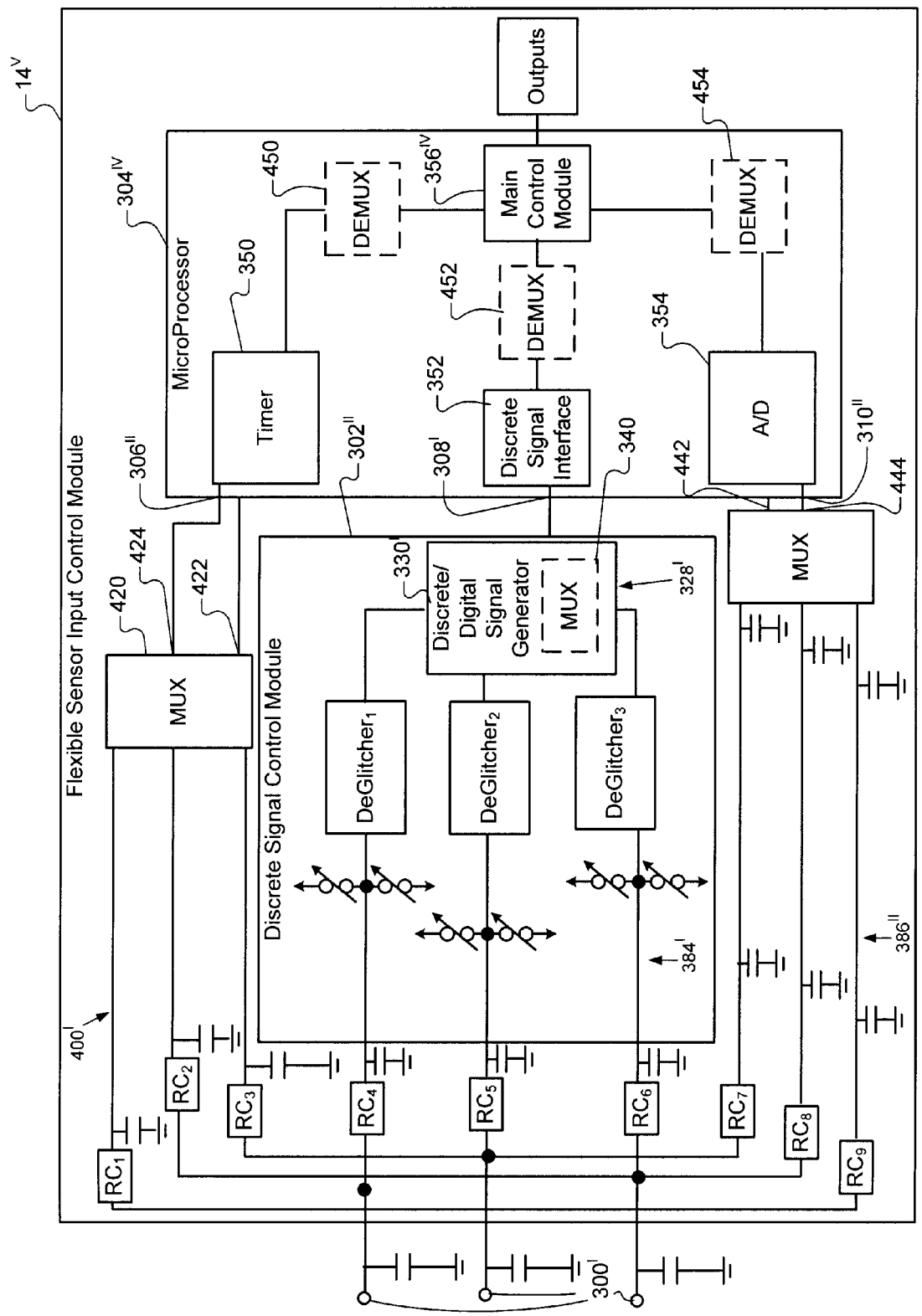
FIG. 7 is a functional block diagram of a control module with multiple flexible sensor inputs and time-based and analog multiplexing in accordance with another embodiment of the present invention.

Referring now to FIG. 3, a functional block diagram of the flexible sensor input control module 14 with a control module input 300, which may be referred to as a flexible sensor input, is shown. The control module 14 may be implemented as a PCB, an ASIC, or as a system-on-chip (SOC). The control module 14 includes one or more discrete signal control modules 302 and a microprocessor 304. For the example embodiment shown, the ratio of microprocessor inputs to control module inputs is 3:1. In other words, the control module input 300 is associated with a time-based input 306, a digital signal input 308 and an analog input 310 on the microprocessor 304. This ratio may vary per application. The embodiments of FIGS. 6 and 7 provide another example in which the ratio is 3:3.

This difference may arise due to a difference in the number of inputs and outputs on the discrete signal control module 302. The ratio difference may also arise due to the association of the control module input 300 to a different number of time-based, digital, and analog inputs on the microprocessor 304. The control module 14 may have any number of control module inputs and each control module input may be associated with any number of microprocessor inputs.

The association of control module inputs with multiple microprocessor inputs of different type provides improved flexibility in design and future use of the control module 14. The control module 14 is thus configured such that each control module input is capable of accommodating many different types of sensors with different characteristics and associated functions.

For the embodiment shown, the control module input 300 is in communication with the time-based, digital and analog inputs 306-310. The control module input 300 receives a sensor signal from a sensor, such as one of the sensors 18 or one of the sensors shown or described with respect to the embodiment of FIG. 2. The sensor signal may be a time-based signal, a discrete signal, or an analog signal. The time-based signal may be provided to the time-based input 306 via a time-based signal line 311. The discrete signal is provided to the discrete signal control module 302 via a discrete signal line 312. The analog signal is provided to the analog signal input 310 via an analog signal line 314. The time-based, discrete, and analog signal lines 311-314 may be bi-directional.

Pre-filtering is provided between the control module input 300 and the time-based, digital and analog inputs 306-310. The pre-filtering may be provided by resistor-capacitor (RC) filters $RC_1$-$RC_3$, respectively, as shown or via other filtering techniques known in the art. The RC filters $RC_1$-$RC_3$ may perform as low-pass filters, high-pass filters, integrators, differentiators, etc.

The sizes and/or associated time constants of the RC filters $RC_1$-$RC_3$ may vary per application. As an example, to prevent damage to circuit components in the event of a short circuit at the control module input 300, the sizes of the resistances in the RC filters $RC_1$-$RC_3$ may be reduced. Additional filtering may be provided in the microprocessor 304 to make up for the reduced size of the resistances. In one embodiment, the time constant of the RC filter $RC_1$ is approximately 0.01 ms or Tau=0.01 ms, and the time constants of the RC filters $RC_2$ and $RC_3$ are 1 ms or Tau=1 ms.

The discrete signal control module 302 is coupled between the RC filter $RC_2$ and the digital input 308. The discrete signal control module 302 is coupled to the RC filter $RC_2$ via the discrete signal line. The discrete signal control module 302 is coupled to the digital input 308 via a digital signal line 316.

The discrete signal control module 302 converts a received or first discrete filtered signal from the RC filter $RC_2$ into a digital signal, which is provided to the digital input 308. The discrete signal control module 302 may include three stages, as shown, or any number of stages. The first stage 320 includes a pull-up device 322 and a pull-down device 324. The second stage 326 includes a deglitcher 327. The third stage 328 includes a discrete/digital signal generator 330.

The pull-up and pull-down devices 322, 324 may be variable and programmable current sources, as shown, current sources, variable resistors, etc. The pull-up device 322 is coupled between the discrete signal line 312 and a voltage source Vcc. The pull-down device 324 is coupled between the discrete signal line 312 and ground. The pull-up and pull-down devices 322, 324 are used to pull-up or pull-down the voltage on the discrete signal line 312. This pull-up/pull-down function may be provided during normal operation of the control module 14, depending upon the sensor attached to the control module input 300, and/or be provided for diagnostic purposes. During diagnostic testing, voltage on the discrete signal line 312 may be adjusted through adjustment in pull-up or pull-down voltage.

The deglitcher 327 is coupled to the discrete signal line 312 and receives a voltage adjusted version of the discrete signal, referred to as a voltage adjusted signal. The deglitcher 327 may perform as a logic state filter, as opposed to an RC filter. The deglitcher 327 does not provide a load on the time-based signal line 311 or the analog signal line 314.

The deglitcher 327 may provide the voltage adjusted signal to the discrete/digital signal generator 330 after the state of the voltage adjusted signal remains constant for a predetermined period of time. For example, when the voltage adjusted signal remains in a HIGH or a LOW state for a predetermined period of time, the voltage adjusted signal is permitted to pass. This removes spikes and/or noise from the voltage adjusted signal to generate a second discrete filtered signal. The spikes may be caused due to rapid transitioning between open and closed states of a switch.

The discrete/digital signal generator 330 generates the digital signal based on the second discrete filtered signal. The discrete/digital signal generator may receive any number of discrete signals. The discrete/digital signal generator 330 may include a multiplexer and convert the discrete signals into a single serial digital signal. A multiplexer is shown in the embodiments of FIGS. 6 and 7. The serial digital signal may be a serial peripheral interface signal, a microsecond signal, or other serial digital signal.

The microprocessor 304 includes a timer 350, a digital signal interface 352, an analog-to-digital (A/D) converter 354 and a main control module 356. The timer 350, the digital signal interface 352, the A/D converter 354 may be part of the main control module 356 or may be separate devices as shown. The microprocessor 304 generates one or more output control signals based on reception of a time-based, digital, or analog signal from the inputs 306-310 that are provided to the control module outputs 358.

The timer 350 is used by the main control module 356 to differentiate between characteristics in the time-based signal, such as differences in frequency, pulse width, etc. The digital signal interface 352 may be a serial peripheral interface, a microsecond interface or other type of serial interface. The A/D converter 354 converts a filtered analog signal from the RC filter $RC_3$ into a digital signal for processing by the main control module 356.

Electromagnetic (EMC) interference capacitors may be used in the control module input 300 and on each of the time-based, discrete, and analog signal lines 311-314, as shown. A first EMC capacitor 360 is coupled between the control module input 300 and ground. A second EMC capacitor 362 is coupled between the output of the RC filter $RC_1$ and/or the time-based input 306 and ground. A third EMC capacitor 364 is coupled between the output of the RC filter $RC_2$ and/or the discrete signal control module input 365 and ground. A fourth EMC capacitor 366 is coupled between the output of the RC filter $RC_3$ and ground. A fifth EMC capacitor 368 is coupled between the analog input 310 and ground. Any number of EMC capacitors may be incorporated.

Figure 4:
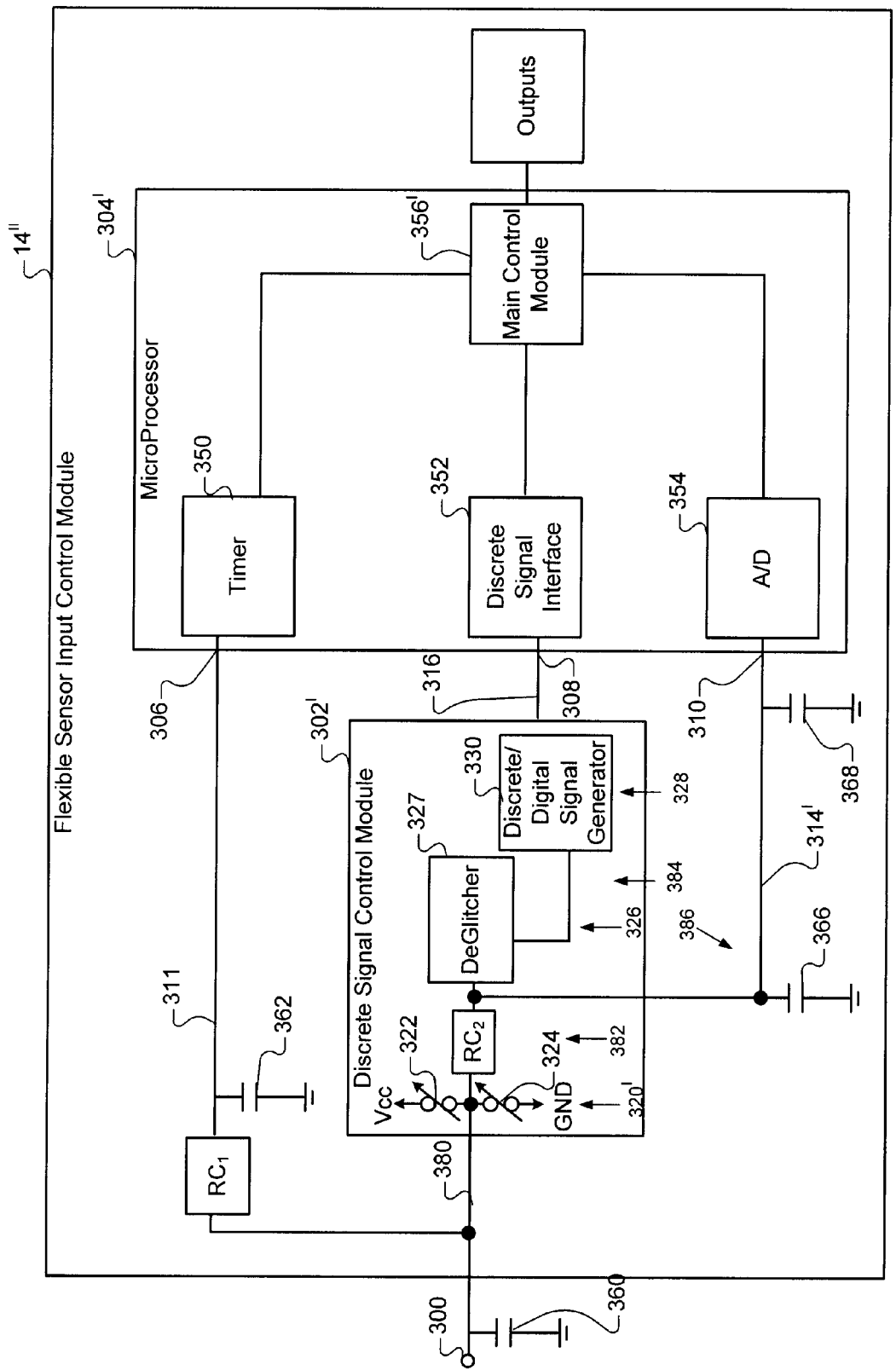
FIG. 4 is a functional block diagram of a control module with a flexible sensor input and time-based pre-filtering in accordance with another embodiment of the present invention.

Referring now to FIG. 4, a functional block diagram of a flexible sensor input control module $14''$ with the flexible sensor input 300 and time-based pre-filtering is shown. The embodiment of FIG. 4 includes the RC filter $RC_1$, a discrete signal control module $302^I$, and a microprocessor $304^I$. In use, a sensor signal is received via the control module input 300 and provided to the time-based signal line 311 and a discrete/analog signal line 380. The discrete signal control module $302^I$, in addition to providing stages with pull-up and pull-down devices, a deglitcher, and a discrete/digital signal generator, provides an additional stage with a RC filter $RC_2^I$.

The first stage $320^I$ includes the pull-up/pull-down devices 322, 324. The second stage 382 includes the RC filter $RC_2^I$, which is shared by a discrete signal path 384 and an analog signal path 386. The third stage 386 includes the deglitcher 327. The fourth stage 388 includes the discrete/digital signal generator 330. This arrangement prevents damage to circuit components should the control module input 300 be shorted to ground, such as due to a failure in an attached sensor.

For the embodiment shown, the control module input 300 is in communication with the time-based, digital, and analog inputs 306-310. The control module input 300 receives a sensor signal from a sensor, such as one of the sensors of the embodiments of FIGS. 1 and 2. A time-based signal may be provided to the time-based input 306 via a time-based signal line 311. A discrete signal or an analog signal may be provided to the discrete signal control module $302^I$ via the discrete/analog signal line 380. The time-based and discrete/analog signal lines 311 and 380 may be bi-directional.

Pre-filtering is provided between the control module input 300 and the time-based, digital and analog inputs 306-310. The pre-filtering may be provided by RC filters $RC_1$-$RC_2$, respectively, as shown or via other filtering techniques known in the art.

The discrete signal control module $302^I$ is coupled between the control module input 300 and the digital input 308 without use of RC filtering. The discrete signal control module $302^I$ is coupled directly to the control module input 300 via the discrete/analog signal line 380. The discrete signal control module $302^I$ is coupled to the digital input 308 via the digital signal line 316.

The discrete signal control module $302^I$ operates in a discrete mode or an analog mode. The discrete signal control module $302^I$ converts a received discrete signal into a digital signal, which is provided to the digital input 308 when in the discrete mode. The discrete signal control module $302^I$ filters a received analog signal when in the analog mode. The analog signal is provided to the analog signal line $314^I$ for reception by the analog input 310.

The pull-up and pull-down devices 322, 324 are used to pull-up or pull-down the voltage on the discrete/analog signal line 380 when a discrete signal is received. The pull-up and pull-down devices 322, 324 are inactive or in an open circuit state when an analog signal is received. The analog signal is provided directly from the control module input 300 to the RC filter $RC_2$.

The deglitcher 327 is coupled between the RC filter $RC_2$ and the discrete/digital signal generator 330 and receives a voltage adjusted version of a discrete signal, referred to as a voltage adjusted signal. The discrete/digital signal generator 330 generates the digital signal based on a discrete filtered signal.

The microprocessor $304^I$ includes a timer 350, the digital signal interface 352, the A/D converter 354 and a main control module $356^I$. The microprocessor $304^I$ may include and/or perform additional filtering over the microprocessor 304 due to the lack of multiple filters in the discrete signal path 384 and/or difference in filtering in the analog signal path 386. In other words, to make up for not using multiple RC filters between the control module input 300 and the digital input 308 and/or the use of a different RC filter for the analog signal path 386, the microprocessor $304^I$ may perform additional filtering. The filtering may be software based. In any of the embodiments disclosed herein, the microprocessor 304 may perform additional filtering over that provided by the external RC filters on time-based, discrete, and analog signal paths.

Electromagnetic (EMC) interference capacitors may be used in the control module input and on the time-based and analog signal lines, as shown. The first EMC capacitor 360 is coupled between the control module input 300 and ground. The second EMC capacitor 362 is coupled between the output of the RC filter $RC_1$ and/or the time-based input 306 and ground. The fourth EMC capacitor 366 is coupled between the output of the RC filter $RC_2$ and ground. The fifth EMC capacitor 368 is coupled between the analog input 310 and ground.

Figure 5:
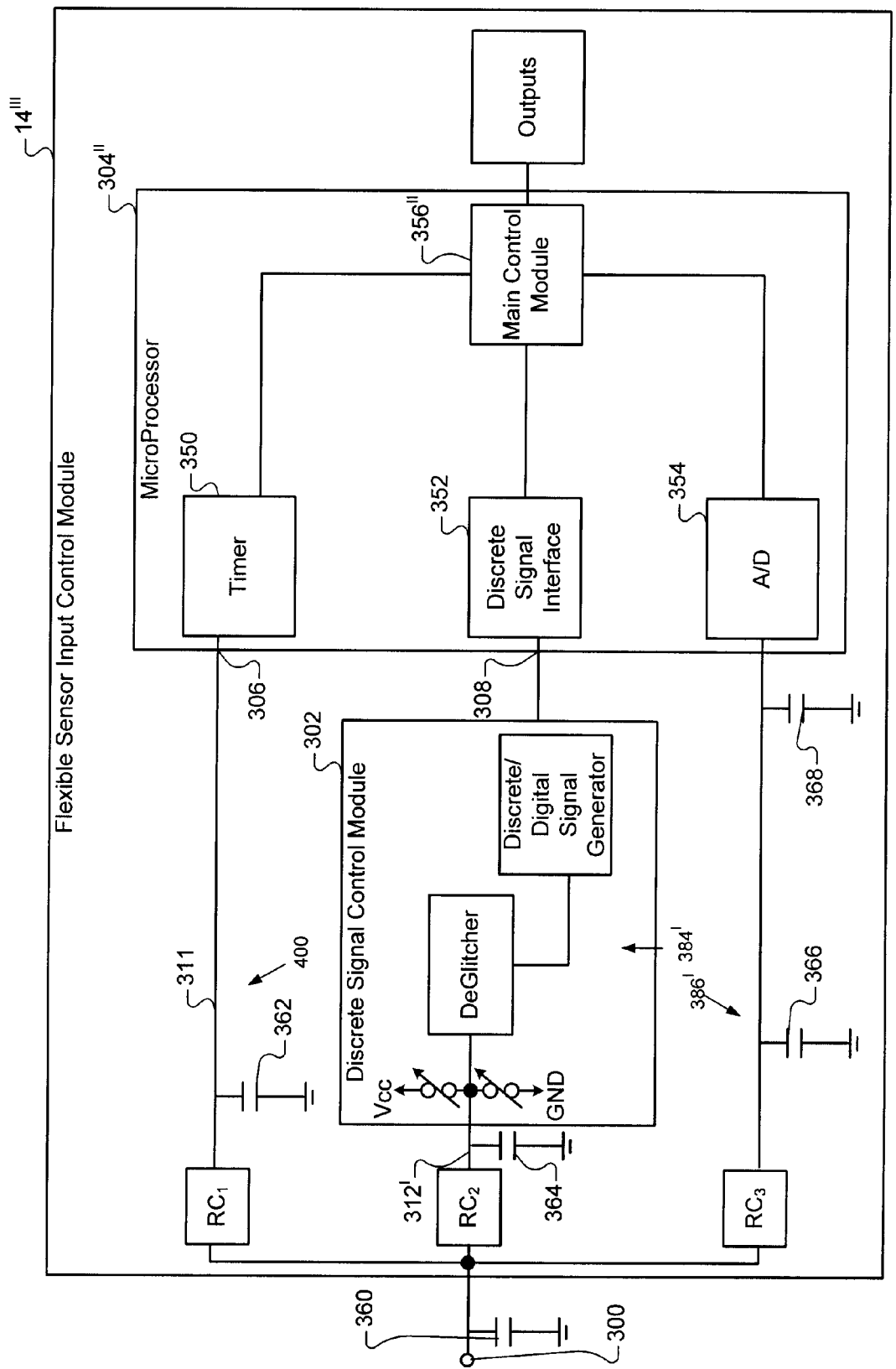
FIG. 5 is a functional block diagram of a control module with a flexible sensor input and time-based and analog pre-filtering in accordance with another embodiment of the present invention.

Referring now to FIG. 5, a functional block diagram of a flexible sensor input control module $14^{III}$ with the flexible sensor input 300 and time-based and analog pre-filtering is shown. The embodiment of FIG. 5 incldes RC filtering on time-based and analog signal paths 400, $386^I$, but not on the discrete signal path $384^I$. The control module $14^{III}$ includes the RC filters $RC_1$-$RC_3$, the discrete signal control module 302, and a microprocessor $304^{II}$. In use, a sensor signal is received via the control module input 300 and provided to the time-based signal line 311, a discrete signal line $312^I$, and the analog signal line 314. An RC filter is not coupled between the control module input 300 and the discrete signal control module 302. This arrangement prevents damage to circuit components should the control module input 300 be shorted to ground.

The discrete signal control module 302 is coupled between the control module input 300 and the digital input 308 without use of RC filtering. The discrete signal control module 302 is coupled directly to the control module input 300 via the discrete signal line $312^I$. The discrete signal control module 302 may include the three stages 320, 326, 328, as shown, or any number of stages.

The microprocessor $304^{II}$ includes the timer 350, the digital signal interface 352, the A/D converter 354 and a main control module $356^{II}$. The microprocessor $356^{II}$ may include and/or perform additional filtering over the microprocessor due to the lack of multiple filters in the discrete signal path $384^I$. In other words, to make up for not using RC filters between the control module input 300 and the digital input 308, the microprocessor $304^{II}$ may perform additional filtering. The filtering may be software based.

Electromagnetic (EMC) interference capacitors may be used on the control module input 300 and the time-based and analog signal lines 311, 314, as shown. For example, the EMC capacitors 360-368 may be used.

Referring now to FIG. 6, a functional block diagram of a variable sensor input control module $14^{IV}$ with multiple control module inputs $300^I$ is shown. Each of the control module inputs $300^I$ has associated time-based, discrete, and analog signal paths.

For the embodiment shown, the control module inputs $300^I$ are in communication with time-based inputs $306^I$, a digital input $308^I$ and analog inputs $310^I$. Time-based signals may be provided to the time-based inputs $306^I$ via time-based signal lines $311^I$. Discrete signals may be provided to a discrete signal control module $302^{II}$ via discrete signal lines $312^{II}$. Analog signals may be provided to the analog signal inputs $310^I$ via analog signal lines $314^{II}$. The time-based, discrete, and analog signal lines $311^I$, $312^{II}$, $314^{II}$ may be bi-directional.

Pre-filtering is provided between the control module inputs $300^I$ and the time-based, digital and analog inputs $306^I$, $308^I$, $310^I$. The pre-filtering may be provided by RC filters $RC_1$-$RC_9$, respectively.

The discrete signal control module $302^{II}$ is coupled between the RC filters $RC_{4-6}$ and the digital input $308^I$. The discrete signal control module $302^{II}$ is coupled to the RC filters $RC_{4-6}$ via the discrete signal lines $312^{II}$. The discrete signal control module $302^{II}$ is coupled to the digital input $308^I$ via a single digital signal line $316^I$. Additional digital signal lines may be included depending on the application.

The discrete signal control module $302^{II}$ converts discrete filtered signals from the RC filters $RC_{4-6}$ into a digital signal, which is provided to the digital input. The discrete signal control module $302^{II}$ may include three stages associated with each of the discrete signal lines, as shown, or any number of stages. The first stage $320^I$ includes pull-up and pull-down devices $322^I$, $324^I$. The second stage $326^I$ includes deglitchers $327^I$. The third stage $328^I$ includes a single discrete/digital signal generator $330^I$ that is shared. Additional discrete/digital signal generators may be incorporated depending upon the number of discrete signal paths and the application.

The discrete/digital signal generator $330^I$ generates the digital signal based on output signals from the deglitchers $327^I$. The discrete/digital signal generator $330^I$ may receive any number of discrete signals and includes a multiplexer 340 and converts the discrete signals into a single serial digital signal. In one embodiment, approximately 20-25 discrete filtered signals, which are provided in parallel and are converted into a single serial digital signal for transmission over the digital signal line $316^I$.

The control module $14^{IV}$ further includes a microprocessor $304^{III}$, which includes the timer 350, the digital signal interface 352, the A/D converter 354 and a main control module $356^{III}$. The microprocessor $304^{III}$ also includes a demultiplexer 410. The demultiplexer 410 may be part of the digital signal interface 352 or the main control module $356^{III}$.

Electromagnetic (EMC) interference capacitors may be used on the control module inputs 300 and each of the time-based, discrete, and analog signal lines $311^I$, $312^{II}$, $314^{II}$, as shown.

Referring now to FIG. 7, a functional block diagram of a control module $14^V$ with the multiple control module inputs $300^I$ and time-based and analog multiplexing is shown. Each of the control module inputs $300^I$ has associated time-based, discrete, and analog signal paths $400^I$, $384^{II}$, $386^{II}$.

Pre-filtering is provided between the control module inputs and the time-based, digital and analog inputs. The pre-filtering may be provided by RC filters $RC_1$-$RC_9$, respectively.

The time-based signal paths $400^I$ include a first multiplexer 420 that is shared. Filtered time-based signals from the RC filters $RC_{1-3}$ are provided to the multiplexer 420. The multiplexer 420 has a control signal input 422 and an output 424. A multiplexed output signal from the multiplexer 420 is provided to a microprocessor $304^{IV}$.

The discrete signal control module $302^{II}$ is coupled between the RC filters $RC_{4-6}$ and the digital input 308'. The discrete signal control module $302^{II}$ may include three stages associated with each of the discrete signal lines, as shown. The third stage $328^I$ includes a single discrete/digital signal generator $330^I$ that is shared. The discrete/digital signal generator $330^I$ includes a second multiplexer or the multiplexer 340.

The analog signal paths $386^{II}$ include a third multiplexer 440 that is shared. Filtered time-based signals from the RC filters $RC_{7-9}$ are provided to the third multiplexer 440. The third multiplexer 440 has a control signal input 442 and an output 444. A multiplexed output signal from the third multiplexer is provided to the microprocessor $304^{IV}$.

The microprocessor $304^{IV}$ includes the timer 350, the digital signal interface 352, the A/D converter 354 and a main control module $356^{IV}$. The microprocessor $304^{IV}$ also includes first, second and third demultiplexers 452, 454, 456 that are associated with the time-based input $306^{II}$, the digital input 308, and the analog input $310^{II}$. The demultiplexers 452, 454, 456 may be part of the timer 350, the digital signal interface 352, and the A/D converter 354 or the main control module $356^{IV}$. The main control module generates the control signals for the multiplexers.

Figure 8:
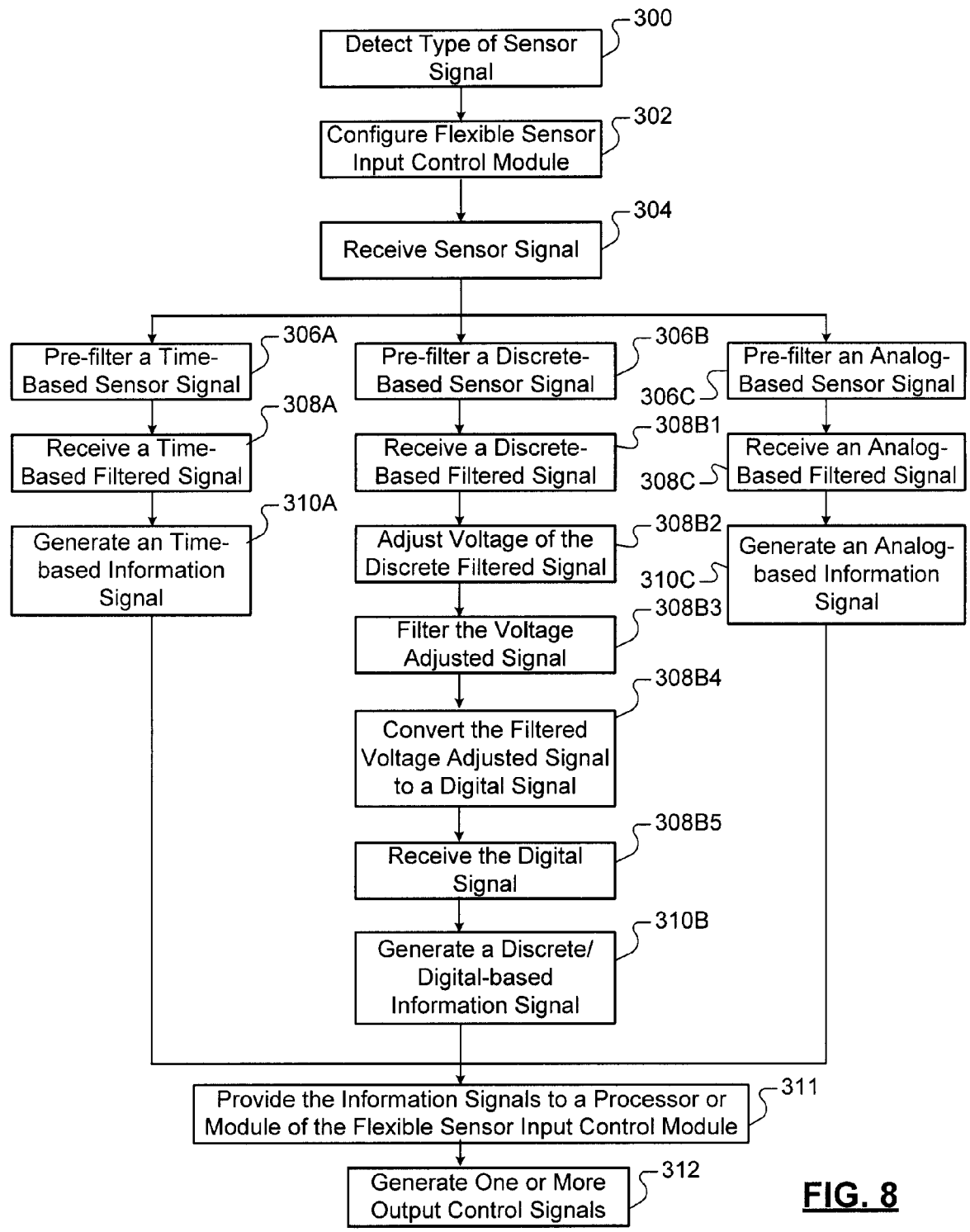
FIG. 8 is a flow diagram illustrating a method of operating a control module that includes a flexible sensor input in accordance with another embodiment of the present invention.

Referring now to FIG. 8, a flow diagram illustrating a method of operating a control module that includes a flexible sensor input is shown. Although the following steps are primarily described with respect to the embodiments of FIGS. 3-7, the steps may be easily modified to apply to other embodiments of the present invention.

Before the reception of a signal from a sensor, a flexible sensor input control module, such as one of the control modules 14-$14^{IV}$, may be configured and/or programmed to receive a particular type of sensor signal. For example, the flexible sensor input control module may be configured to receive a time-based, discrete, or analog signal via a control module input. The flexible sensor input control module may then detect a time-based, digital, or analog signal via a time-based input, a digital input or an analog input, respectively. The flexible sensor input control module may configure a discrete signal control module, such as one of the discrete signal control modules 302-$302^{II}$, to provide a certain pull-up or pull-down voltage based on knowledge of the sensor. This programming may occur during or after manufacture of the flexible sensor input control module.

In step 300, a microprocessor may detect the type of sensor signal received, such as a time-based, digital or analog signal or the type of sensor signal may be predetermined and selected on an application basis. The detection may be associated with the frequency of the received signal and/or the sampling rate of each of the microprocessor inputs.

In step 302, the microprocessor may configure the control module as described above based on the type of sensor signal received. In step 304, a sensor input signal is received at a control module input.

In step 306A-C, the sensor signal may be prefiltered on one or more of a time-based, discrete and/or analog signal paths. The filtering may be based on the type of sensor signal received.

In step 308, one of a time-based, digital or analog signal is selectively received based on the received sensor signal. The other signals may selectively not be received through control of time-based, discrete/digital and analog signal paths and corresponding devices, inputs and outputs. For example, in the following step 308B4, the digital signal may not be generated when a time-based or analog signal is being received.

In step 308A, a filtered time-based signal is received by a time-based input of the microprocessor. In step 308B1, a filtered discrete signal is received by a discrete signal control module. In step 308B2, the filtered discrete signal may be adjusted via a pull-up or pull-down device. In step 308B3, the adjusted voltage signal is filtered via a deglitcher. In step 308B4, the filtered adjusted voltage signal is converted to a serial digital signal via a discrete/digital signal generator. In step 308B5, the digital signal is received by a digital signal input of the microprocessor. In step 308C, a filtered analog signal may be received by an analog input of the microprocessor.

In step 310A, a timer of the microprocessor generates a first information signal based on the filtered time-based signal. In step 310B, a digital signal interface of the microprocessor generates a second information signal based on the digital signal. In step 310C, an A/D converter of the microprocessor generates a third information signal based on the filtered analog signal.

In step 311, one or more of the information signals from step 310 are available for reception by the microprocessor and/or a main control module of the microprocessor.

In step 312, the main control module of the microprocessor may generate one or more output control signals based on output of one of the timer, the digital signal interface and the A/D converter. The output control signals may be used to adjust operation of one or more vehicle systems, components and/or devices, such as one of the systems, components and/or devices of the embodiments of FIGS. 1 and 2.

The above-described steps are meant to be illustrative examples; the steps may be performed sequentially, synchronously, simultaneously, continuously, during overlapping time periods or in a different order depending upon the application.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control module comprising:
    a sensor input that receives a sensor signal;
    a discrete signal control module that comprises a discrete signal input and that selectively generates a digital signal based on said sensor signal; and
    a processor comprising:
        a time-based input that is in communication with said sensor input;
        a digital signal input that is in communication with said discrete signal control module; and
        an analog input that is in communication with said sensor input,
    wherein said processor selectively receives one of said sensor signal and said digital signal via one of said time-based input, said digital signal input and said analog input.

2. The control module of claim 1 wherein said discrete signal control module includes a variable and programmable current source that at least one of pulls-up and pulls-down voltage of said sensor input.

3. The control module of claim 2 wherein said variable and programmable current source at least one of pulls-up and pulls-down voltage of said sensor input based on a control signal from said processor.

4. The control module of claim 1 wherein said discrete signal control module includes a variable and programmable resistance that at least one of pulls-up and pulls-down voltage of said sensor input.

5. The control module of claim 1 wherein said discrete signal control module includes a deglitcher that filters said sensor signal.

6. The control module of claim 5 wherein said deglitcher passes said filtered sensor signal after a predetermined time interval.

7. The control module of claim 1 wherein said discrete signal control module comprises:
a first variable and programmable current source that at least one of pulls-up and pulls-down voltage of said sensor signal to generate a voltage adjusted signal; and
a first deglitcher that filters said voltage adjusted signal to generate a first discrete signal.

8. The control module of claim 7 wherein said discrete signal control module further comprises:
a second variable and programmable current source that at least one of pulls-up and pulls-down voltage of another sensor signal to generate another voltage adjusted signal; and
a second deglitcher that filters said another voltage adjusted signal to generate a second discrete signal.

9. The control module of claim 8 further comprising a digital signal generator that generates said digital signal based on said first discrete signal and said second discrete signal.

10. The control module of claim 1 wherein said processor comprises a main control module that generates an output control signal based on one of said sensor signal and said digital signal.

11. The control module of claim 1 wherein said processor selectively receives one of said sensor signal and said digital signal and does not receive said other one of said sensor signal and said digital signal.

12. A control system comprising the control module of claim 1 and further comprising a vehicle system,
wherein said processor generates an output control signal based on one of said sensor signal and said digital signal, and
wherein said vehicle system performs a task based on one of said sensor signal and said digital signal.

13. The control system of claim 12 wherein said control module is implemented as a printed circuit board, and
wherein said discrete signal control module includes an application specific integrated circuit.

14. The control system of claim 12 wherein said vehicle system includes at least one of a vehicle actuator, and
wherein said control module adjusts said vehicle actuator via said output control signal.

15. The control system of claim 12 wherein said control module adjusts at least one of ignition timing, fuel flow, and air flow via said output control signal.

16. A method of operating a control module comprising:
receiving a sensor signal from a sensor input;
selectively receiving a discrete signal based on said sensor signal;
selectively generating a digital signal based on said discrete signal;
selectively receiving one of a time-based input signal, said digital signal, and an analog input signal based on said sensor signal; and
generating an output control signal based on a selected one of said time-based input signal, said digital signal, and said analog input signal.

17. The method of claim 16 further comprising:
at least one of pulling up and pulling down voltage of said sensor signal to generate a voltage adjusted signal; and
filtering said voltage adjusted signal to generate a first discrete signal.

18. The method of claim 17 further comprising:
at least one of pulling up and pulling down voltage of another sensor signal to generate another voltage adjusted signal; and
filtering said another voltage adjusted signal to generate a second discrete signal.

19. The method of claim 18 comprising generating said digital signal based on said first discrete signal and said second discrete signal.

20. The method of claim 16 wherein said sensor signal includes one of said time-based input signal, said discrete signal and said analog signal and not said other ones of said time-based input signal, said discrete signal and said analog signal.

* * * * *